(12) United States Patent
Goyke

(10) Patent No.: US 11,680,615 B2
(45) Date of Patent: Jun. 20, 2023

(54) DISC BRAKE, BRAKE CALIPER OF A DISC BRAKE, AS WELL AS HOLD-DOWN PIECE AND LEAF SPRING FOR SECURING THE BRAKE LININGS OF A DISC BRAKE

(71) Applicant: BPW Bergische Achsen KG, Wiehl (DE)

(72) Inventor: Georg Goyke, Nümbrecht (DE)

(73) Assignee: BPW Bergische Achsen KG, Wiehl (DE)

( * ) Notice: Subject to any disclaimer, the term of this patent is extended or adjusted under 35 U.S.C. 154(b) by 496 days.

(21) Appl. No.: 16/606,234

(22) PCT Filed: Apr. 17, 2018

(86) PCT No.: PCT/DE2018/100363
§ 371 (c)(1),
(2) Date: Oct. 18, 2019

(87) PCT Pub. No.: WO2018/192627
PCT Pub. Date: Oct. 25, 2018

(65) Prior Publication Data
US 2020/0141458 A1    May 7, 2020

(30) Foreign Application Priority Data

Apr. 18, 2017    (DE) ................... 10 2017 108 175.5

(51) Int. Cl.
*F16D 65/097*    (2006.01)
*F16D 55/22*    (2006.01)
(Continued)

(52) U.S. Cl.
CPC ......... *F16D 65/0977* (2013.01); *F16D 55/22* (2013.01); *F16D 65/0068* (2013.01); *F16F 1/26* (2013.01); *F16D 2055/0016* (2013.01)

(58) Field of Classification Search
CPC .............. F16D 65/097; F16D 65/0977; F16D 65/0978; F16D 55/22; F16D 65/0068; F16D 2055/0016; F16F 1/26
(Continued)

(56) References Cited

U.S. PATENT DOCUMENTS 10,767,714 B2*   9/2020   Krause ................ F16D 65/0978
10,890,224 B2*   1/2021   Neumann ............. F16D 65/097
(Continued)

FOREIGN PATENT DOCUMENTS

CN        102 011 816        4/2011
DE    20 2008 013 446        5/2009
(Continued)

*Primary Examiner* — Christopher P Schwartz
(74) *Attorney, Agent, or Firm* — Gudrun E. Huckett

(57) ABSTRACT

The invention relates to a disc brake comprising a brake caliper (1), which engages over a brake disc that can rotate on an axis (A) and brake linings (2, 3) arranged on both sides thereof in a lining groove (6), comprising a hold-down arrangement (8) formed by a rigid hold-down piece (7) and a leaf spring (9) and leading transversely over the brake linings (2, 3), wherein the hold-down piece (7) has a central section (7b) forming the majority of its total length and leading over the lining groove (6), and two end sections (7a, 7c), wherein the hold-down piece is supported against the brake linings (2, 3) towards the disc brake axis (A), and wherein said hold-down piece extends at least partially into a slot (14) of the brake caliper (1) with the first end section (7a) thereof, and wherein the leaf spring (9) extends in the longitudinal direction of the hold-down piece (7) and is spring-elastically supported against the outer side of the hold-down piece (7) facing away from the brake linings (2, 3). In order to more simply configure the fixing of the elements of the hold-down arrangement in terms of assembly and production, without thereby weakening the fixture, (Continued)

the first end section (7a) of the hold-down piece (7) is angled in relation to the central section (7b).

28 Claims, 8 Drawing Sheets

(51) Int. Cl.
*F16D 65/00* (2006.01)
*F16F 1/26* (2006.01)
*F16D 55/00* (2006.01)

(58) Field of Classification Search
USPC ................................ 188/73.32, 73.36–73.38
See application file for complete search history.

(56) References Cited

U.S. PATENT DOCUMENTS

2006/0061021 A1* 3/2006 Dittmar ................... F16F 1/26
  267/47
2015/0184710 A1* 7/2015 Peschel ................ F16D 55/225
  188/73.32
2016/0273600 A1* 9/2016 Radhakrishnan ... F16D 65/0977

FOREIGN PATENT DOCUMENTS

| DE | 20 2006 021 291 | 1/2015 |
| DE | 10 2015 000 857 | 8/2015 |
| DE | 10 2014 107 227 | 9/2015 |
| EP | 1 898 115 | 3/2008 |

\* cited by examiner

DISC BRAKE, BRAKE CALIPER OF A DISC BRAKE, AS WELL AS HOLD-DOWN PIECE AND LEAF SPRING FOR SECURING THE BRAKE LININGS OF A DISC BRAKE

BACKGROUND OF THE INVENTION

The invention relates first of all to a disk brake having a brake caliper which engages over a brake disk, which can be rotated on an axis, and over brake linings which are arranged on the two sides thereof in a lining shaft, having a hold-down arrangement which leads transversely over the brake linings consisting of a rigid hold-down and a leaf spring, the hold-down having a center section, which forms the greatest part of its overall length and leads over the lining shaft, and two end sections, said hold-down being supported against the brake linings toward the disk brake axis and extending with its first end section into a slot of the brake caliper, and the leaf spring extending in the longitudinal direction of the hold-down and being supported resiliently against that outer side of the hold-down which faces away from the brake linings.

Furthermore, the invention relates to a brake caliper of a vehicle disk brake having a lining shaft for receiving the brake linings, and the brake disk of the disk brake, which brake disk rotates on an axis, and having a slot for fastening the one end of a hold-down arrangement which leads over the lining shaft on the brake caliper outer side, the slot being at least delimited by way of a rear wall, an upper inner face which faces the axis, and a lower inner face which faces away from the axis.

Furthermore, the invention relates to a hold-down for fastening brake linings in a disk brake having a longitudinal extent and a width which is smaller than the latter, the hold-down having a center section, which forms the greatest part of its overall length and leads over the lining shaft of the disk brake, and two end sections.

Finally, the invention relates to a leaf spring of a hold-down arrangement for the brake linings of a vehicle disk brake, having two main sides and, following one another, a first spring end, a spring center section and a second spring end.

A disk brake of this type, a brake caliper of this type, a hold-down of this type and a leaf spring of this type are known partially together overall and partially as individual elements from EP 1 898 115 B1. In order to fasten and secure the brake linings which are arranged in a lining shaft of the brake caliper of the disk brake, a hold-down arrangement which is constructed in two pieces extends over the lining shaft and at the same time transversely over the brake linings which are arranged in the lining shaft. A rigidly configured hold-down of the hold-down arrangement is supported against the brake linings toward the disk brake axis. The support takes place under spring force, to which end a leaf spring which is fixed with its ends with respect to the brake caliper extends on the outside, along the hold-down. Said leaf spring loads the hold-down with a hold-down force toward the disk brake axis, as a result of which the brake linings are held in their respective receptacles in the brake caliper or in a brake carrier. The hold-down has a length such that it protrudes with one end as far as into a recess in the brake caliper. The circumferential contour of the recess is adapted to the cross-sectional contour of the hold-down, as a result of which the hold-down is fixed both radially in relation to the disk brake axis and also transversely with respect thereto, that is to say in the circumferential direction of the brake disk. On account of the extensive adaptation to the cross section of the hold-down, however, the recess cannot be manufactured simply, but rather special milling tools are required for manufacturing it.

SUMMARY OF THE INVENTION

The invention is therefore based on the object of making the fastening of the elements of the hold-down arrangement simpler in terms of assembly and also manufacture, without weakening the fastening in the process.

To this end, it is proposed in the case of a disk brake having the features indicated at the outset that the first end section of the hold-down which extends into the slot in the brake caliper is angled away relative to the center section of the hold-down.

In terms of assembly, this has the advantage that the hold-down can be moved into the slot of the brake caliper, preferably in an obliquely running movement. This is associated with a solution which is particularly space-saving and nevertheless leads to stable fixing of the hold-down. A space-saving solution is advantageous in the case of a vehicle disk brake, in particular, since there is only a small radial spacing on the brake caliper outer side from the vehicle rim or the vehicle wheel which rotates around the brake caliper. Only a very limited amount of space for stable fastening of the hold-down or the structural unit comprising the hold-down and the leaf spring is available precisely in the region of the lining shaft.

By virtue of the fact that the slot in the brake caliper, which slot receives the ends of the hold-down and the leaf spring, is arranged obliquely with regard to the rotational axis of the brake disk, said end of the hold-down arrangement can be fixed on the brake caliper with a low space requirement but nevertheless in a stable manner.

One refinement is particularly advantageous here, in the case of which the angle, at which the slot is arranged in relation to the rotational axis of the brake disk, is between 10° and 35°, and preferably between 15° and 25°. Accordingly, one refinement of the hold-down provides that its first end section is angled away relative to the center section at an angle of from 10° to 35°, preferably from 15° to 25°. In particular, an angle of approximately 20° is advantageous. It is therefore advantageous if the slot has the same inclination relative to the center section as the first end section of the hold-down. This means that both the first end section of the hold-down and the slot are inclined at the same angle in relation to the brake disk axis. This can be realized simply in terms of manufacturing technology.

The slot is preferably open in each case in the lateral direction of the hold-down. The slot is therefore delimited only by way of a rear wall, an upper inner face which faces the rotational axis of the brake disk, and a lower inner face.

The slot can be manufactured simply as a result of the simple (since it is open on the side) form of said slot, for example directly by way of casting or by way of simple machining of the brake caliper using a milling tool. Here, the upper inner face, the lower inner face and the rear wall of the slot can be formed and machined simply. Said machining can take place in a single machining movement by means of a side milling cutter, by the latter being moved into the brake caliper in an oblique movement in the direction of the depth of the slot. As a result, the rear wall of the slot is given a circular arcuate form.

In addition, there is the possibility to move the side milling cutter somewhat to the side, after it has been moved to a maximum extent in the direction of the depth of the slot, and only then to withdraw it. In the case of manufacturing of this type, the rear wall of the slot consists of a straight center section and circular arc sections which adjoin the former in a step-free manner and the circle center points of which are situated outside the brake caliper, and are preferably situated above the lining shaft.

According to the invention, it is advantageous, furthermore, that the cutout which is arranged on the first end section of the hold-down is open in the direction of the rear wall of the slot and in the direction of its upper and lower inner faces, and is delimited in the lateral direction on both sides by way of side sections of the hold-down.

Said cutout preferably has a U-shaped contour. In the assembled state, the end-side opening of the U-shaped cutout lies opposite the rear wall of the caliper-side slot. The leaf spring engages with its one end into the cutout, to be precise preferably with its entire width.

It is then advantageous, in particular, that the leaf spring is supported resiliently at least on the upper inner face of the slot and on the outside on the center section of the hold-down. This ensures firstly fastening of the hold-down in a direction vertically with respect to the brake disk axis with regard to the brake pads or brake linings, and secondly with regard to the brake caliper. The manufacturing complexity for said components is reduced considerably by way of simple fastening of this type.

In relation to the hold-down and its stability, it is advantageous if it is configured at least on its center section as a channel consisting of an elongate base and side flanks which are arranged on the sides of the base. The two side flanks can also additionally be extended, by being arranged not only along the base, but rather, moreover, along the first end section.

It is proposed with regard to the brake caliper according to the invention that at least the upper inner face of the slot which is configured in the brake caliper is arranged at an angle obliquely with respect to the rotational axis of the brake disk. Said angle is preferably between 10° and 35°, and particularly preferably between 15° and 25°.

In order to avoid weakening of the brake caliper in the region of the fastening of the hold-down arrangement, one particularly advantageous refinement of the brake caliper provides that the material thickness which the brake caliper has between the upper inner face of the slot and the outer side of the brake caliper increases starting from the lining shaft. The material thickness preferably increases in the form of a widening wedge.

In order that the manufacture of the slot can take place by means of a standard side milling cutter, the lower inner face of the slot is preferably also arranged at an angle obliquely with respect to the axis, the lower inner face preferably being arranged parallel to the upper inner face.

The use of a rotating side milling cutter results in the design of the rear wall of the slot in such a way that said rear wall extends on a circular arc, the circle center point of which is situated outside the brake caliper, and preferably above the lining shaft. In addition, there is the possibility to move the side milling cutter somewhat to the side, after it has been moved to a maximum extent in the direction of the depth of the slot, and only then to withdraw it. In the case of manufacturing of this type, the rear wall of the slot consists of a straight center section and circular arc sections which adjoin the former in a step-free manner and the circle center points of which are situated outside the brake caliper, and are preferably situated above the lining shaft.

It is proposed with regard to the hold-down according to the invention that the first end section of the hold-down is angled away relative to the center section.

The first end section of the hold-down is preferably provided with a cutout for the engagement of a leaf spring.

Together with the other components of the disk brake, simplified assembly of the hold-down with respect to the brake caliper and the brake pads or brake linings is made possible as a result. A contribution is made to this, in particular, if the first end section is angled away relative to the center section at an angle of from 10° to 35°, preferably from 15° to 25°.

The cutout in the region of the first end section of the hold-down is preferably of U-shaped contour, and is delimited in the lateral direction on both sides by way of side sections of the hold-down. The side sections are admittedly not separate structural components. Rather, the cutout is machined into a preformed hold-down, for example by way of punching or milling.

The cutout can also be formed directly during the manufacture of the hold-down. The cutout is open at the top, at the bottom, and on the end side away from the hold-down.

The hold-down is preferably configured at least on its center section as a channel consisting of an elongate base and side flanks which are arranged on the sides of the base. Inter alia, they bring about a reinforcement of the hold-down.

The width of the channel is preferably equal to the width of the cutout on the end section of the hold-down.

In relation to the hold-down and its stability, it can be advantageous if the two side flanks are additionally extended, by being arranged not only along the base, but rather, moreover, along the first end section. Said additional side flanks sections can serve to additionally laterally support the hold-down which is seated in the slot of the brake caliper.

Furthermore, it is advantageous that the termination of the first end section is formed by an end side which extends on a circular arc, the circle center point of which is situated outside of the hold-down, and is preferably situated above the center section.

With regard to the leaf spring according to the invention, it is proposed that the termination of the spring ends is formed in each case by positively locking elements which extend away from the main sides in opposed directions with regard to the main sides of the leaf spring in such a way that the first positively locking element is situated on the first main side, and the second positively locking element is situated on the second main side. In addition, the leaf spring has, on the spring center section, at least two bends or kinks with opposed bending directions. The bend outer side of the bend which is arranged closest to the first spring end is situated on the second main side, and the bend outer side of the at least one further bend is situated on the first main side of the leaf spring.

The first of said bends is intended to adapt the longitudinal course of the leaf spring favorably to the form of the slot and, in particular, to the oblique course of the upper inner face of the slot. In contrast, the other bend is intended to be supported against the outer side of the hold-down, and to thus load said hold-down with a spring force in the direction of the brake linings.

In accordance with one refinement of the leaf spring, the first bend, that is to say the bend which is arranged closest to the first spring end, is arranged on the first sixth of the overall length of the leaf spring. This first bend is preferably arranged at a spacing of from 1.5 cm to 3 cm from the first positively locking element.

In contrast, the second bend which is intended for supporting on the outside on the hold-down in the assembled state is preferably arranged on the middle third of the overall length of the leaf spring.

In accordance with a further refinement of the leaf spring, the width of the two main sides of the leaf spring is constant over the entire length of the leaf spring.

Advantageous refinements of the disk brake and the hold-down are specified in the respective dependent claims.

BRIEF DESCRIPTION OF THE DRAWINGS

Specific refinements of the disk brake, the brake caliper, the hold-down and the leaf spring will be described in greater detail in the following text on the basis of the drawings, in which.

DESCRIPTION OF PREFERRED EMBODIMENTS

Figure 1:
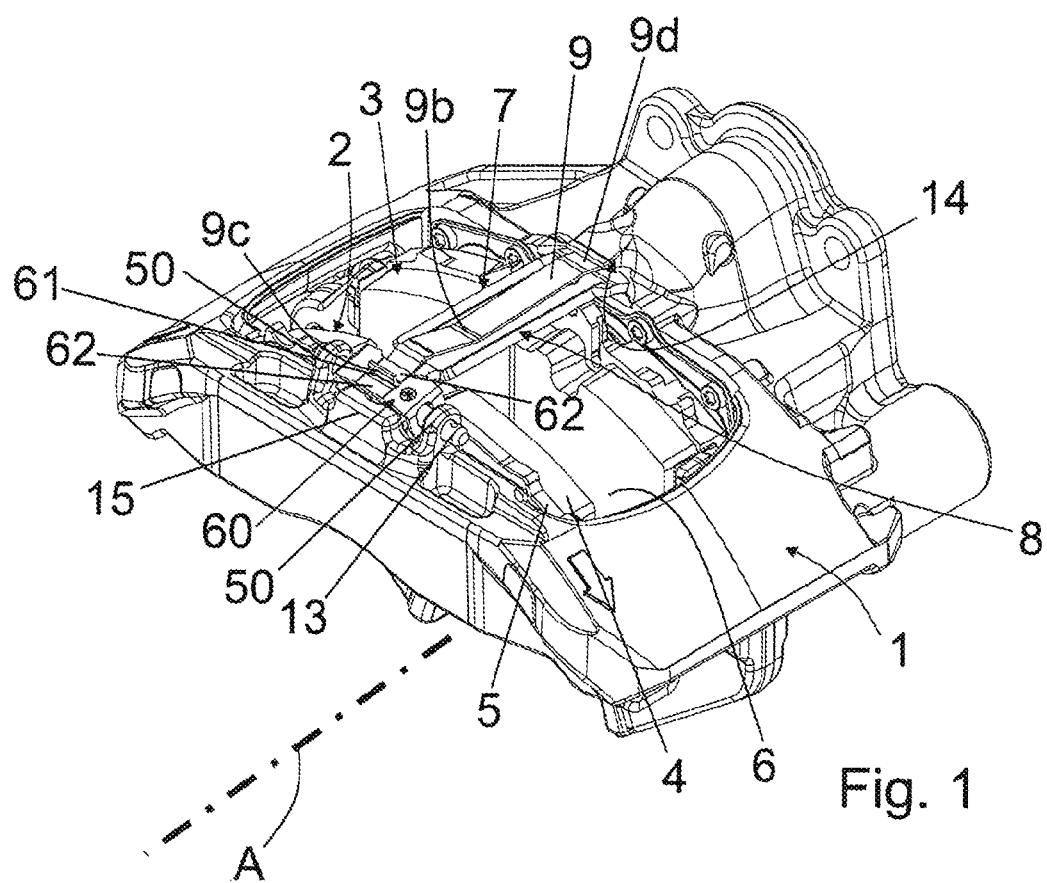
FIG. 1 shows a perspective illustration of the brake caliper of a vehicle disk brake including the lining shaft which is configured in the brake caliper with a brake lining which is arranged therein, and a hold-down arrangement above the lining shaft.
Figure 2:
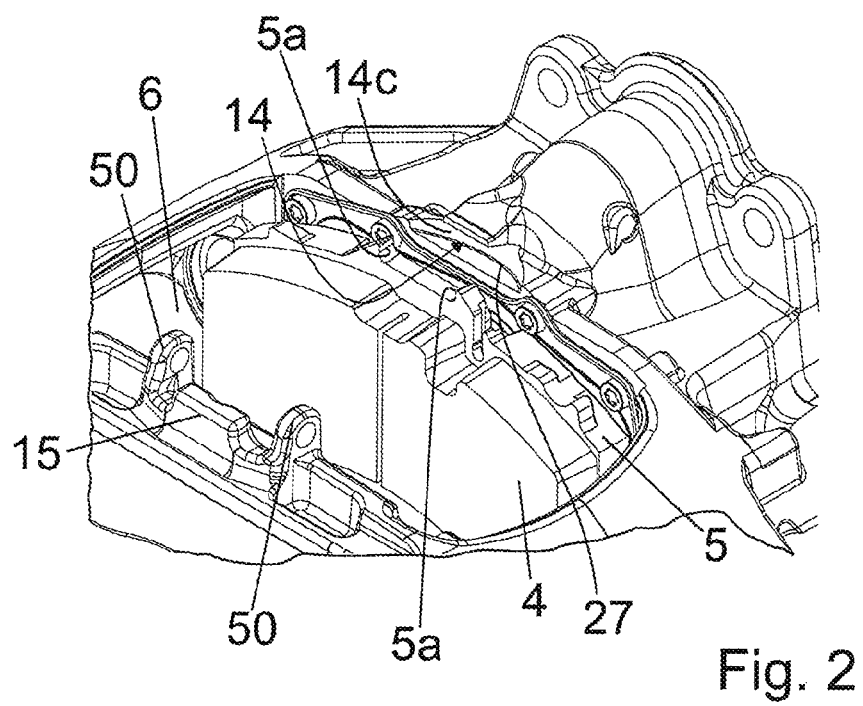
FIG. 2 shows an enlarged view of the object according to FIG. 1, but without the parts of the hold-down arrangement which is reproduced completely in FIG. 1.
Figure 3:
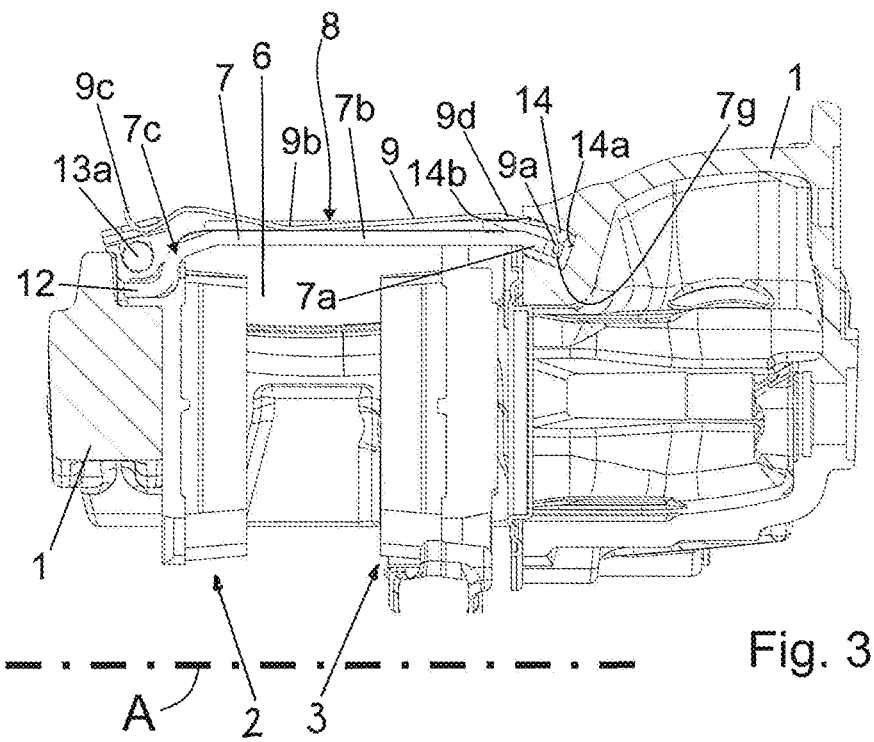
FIG. 3 shows the objects according to FIG. 1 in a longitudinal section through the brake caliper.
Figure 3A:
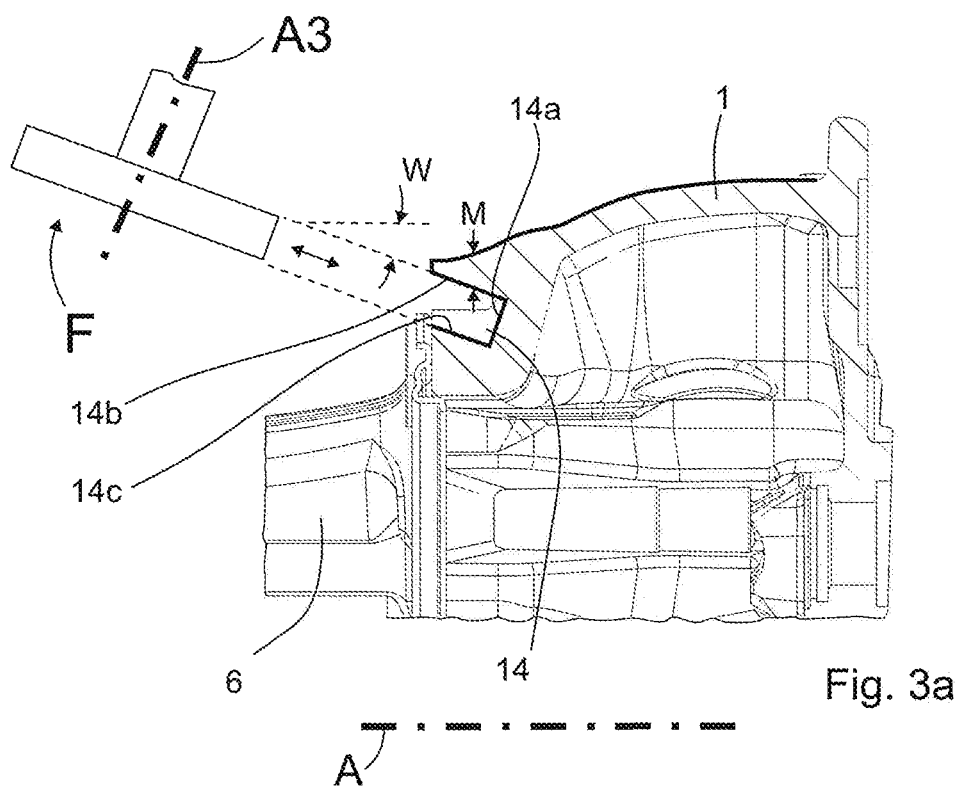
FIG. 3a shows a longitudinal section which corresponds to FIG. 3, but exclusively through the brake caliper itself and with an additional illustration of a side milling cutter which is positioned in the machining position in front of the brake caliper.

FIGS. 1-3a show the central part of the brake caliper 1 of a vehicle disk brake for commercial vehicles. FIG. 2 shows the brake caliper in an enlarged view, FIG. 3 and FIG. 3a show it in a longitudinal section. The disk brake can be of the sliding caliper design or of the fixed caliper design. In each case one brake lining is arranged on each side of the brake disk which is reproduced only using its rotational axis A (FIG. 3). In order to receive the brake linings 2, 3, the brake caliper 1 is provided with a lining shaft 6, over which a lining hold-down 7 extends. The lining hold-down 7 bridges the lining shaft 6 in such a way that the lining hold-down 7 extends transversely over the two brake linings 2, 3, namely the brake lining 2 which is arranged on the outside of the vehicle and the brake lining 3 which is arranged on the inside of the vehicle, which brake linings 2, 3 are of different design here.

Figure 4:
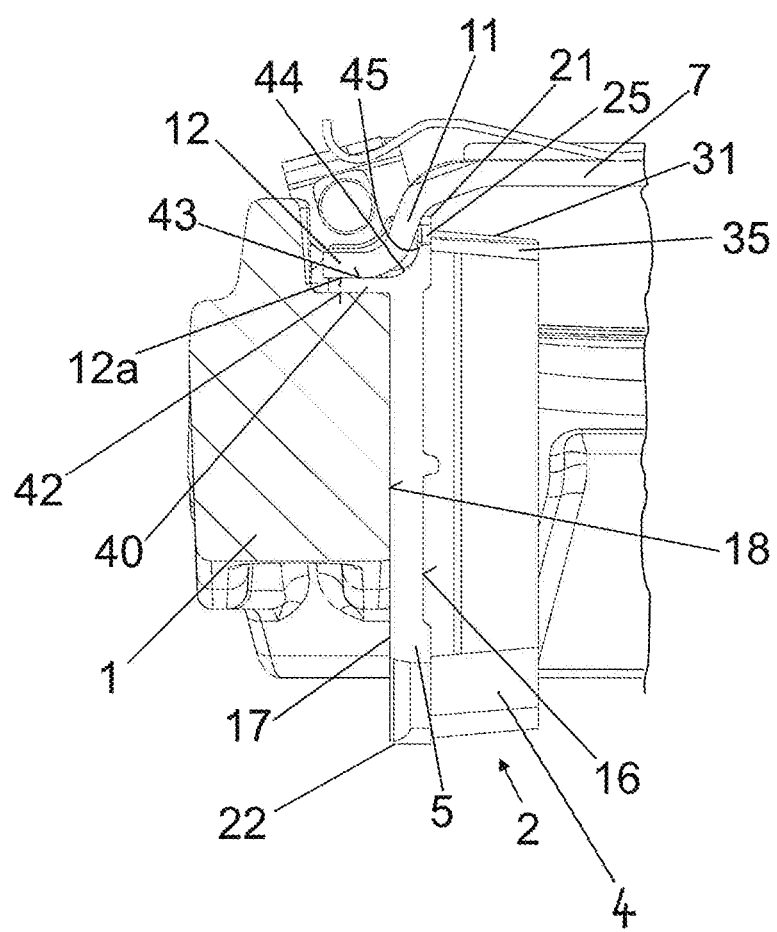
FIG. 4 shows the left hand region of FIG. 3 on an enlarged scale.

According to FIG. 4, the brake linings 2, 3 consist in each case of the actual friction lining 4 and a rear plate 5. The rear plate 5 preferably consists of cast metal. The rear plate 5 serves for the improved distribution of the brake pressure over the lining area. Moreover, it assumes the guidance and the support of the brake lining either on the brake caliper 1 itself, or on a brake carrier which is fixed to the axle.

Figure 7:
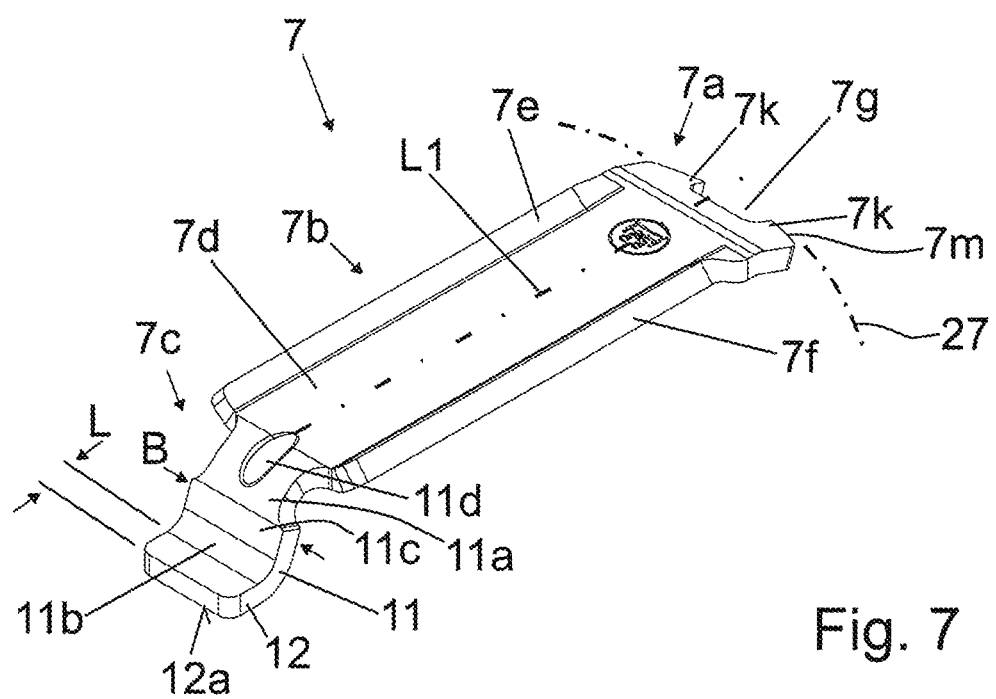
FIG. 7 shows a perspective illustration only of that hold-down of the hold-down arrangement which is used on the brake caliper.

The lining hold-down 7 which is reproduced as an individual part in FIG. 7 is of elongate design along its longitudinal center line L1, and extends with the greatest part of its length parallel to the axis A, about which the brake disk rotates. Its first end section 7a which is reproduced on the right hand side, that is to say that end of the hold-down 7 on the inside of the vehicle, is received directly in the brake caliper 1, to which end the first end section 7a of the hold-down 7 is seated in a slot 14 (FIG. 3) of the brake caliper 1. The other end section 7c of the hold-down 7 is fastened indirectly to the brake caliper 1 by means, inter alia, of a pin, which will be described in greater detail.

In order to secure the two brake linings 2, 3 in the lining shaft 6, the hold-down 7 is configured as a rigid hoop, and is combined with a resilient leaf spring 9 to form a hold-down arrangement 8 (FIG. 3). The role of the two-piece hold-down arrangement 8 is to fix the two brake linings 2, 3 with respect to the lining shaft 6 in such a way that the brake linings 2, 3 cannot pass or fall out of the lining shaft 6 radially to the outside, in relation to the axis A of the brake disk.

The hold-down 7 is of channel-shaped cross section over the predominant part of its overall length and, in particular, on its center section 7b, with a base 7d which is arranged on the longitudinal center line L1 of the hold-down 7 and is adjoined by side flanks 7e, 7f along the two longitudinal edges of the base 7d, which side flanks 7e, 7f reinforce the center section 7b of the hold-down 7 against bending forces.

That flat bottom of the channel which is formed by way of the base 7d and has approximately the width of the leaf spring 9 is adjoined on both sides by the side flanks 7e, 7f at an angle between 15° and 90°.

The hold-down 7 is supported by way of the base 7d directly on the upper edge of the lining rear plate 5 of the inner brake lining 3. At the same time, the flanks 7e, 7f of the hold-down can be supported laterally, to be precise on stops 5a on the upper rim of the lining rear plate 5. The two stops 5a prevent it being possible for the hold-down 7 to perform relatively great lateral movements relative to the inner brake lining 3.

The leaf spring 9 which consists of a spring steel likewise extends on the longitudinal center line L1. It is fastened with one spring end 9a in a first spring abutment, and with the other spring end 9c in a second spring abutment. The two fastenings are releasable, in order to remove the spring 9 and the lining hold-down 7 which is arranged underneath it, and in order thus to gain access to the lining shaft 6 from the outside for the exchange of the brake linings 2, 3.

The leaf spring 9 extends on the outer side of the hold-down 7 longitudinally with respect to the latter, and it is supported from the outside against the hold-down 7, in particular against its center section 7b in the region of the base 7d (see FIGS. 3 and 9), as a result of which it is spring-loaded toward the two brake linings 2, 3. Therefore, although it is itself rigid, the hold-down 7 is supported under a permanent spring force against the two brake linings 2, 3, and loads the latter in each case with a force which is directed toward the rotational axis A.

Figure 8:
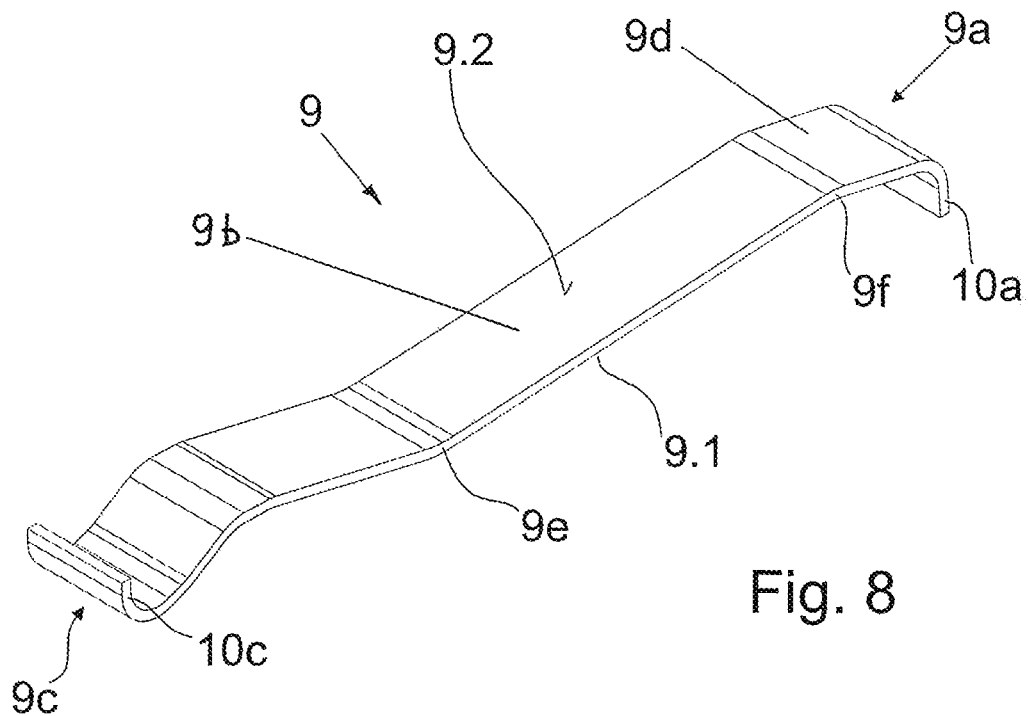
FIG. 8 shows a perspective illustration only of the leaf spring which is used on the brake caliper as a constituent part of the hold-down arrangement.
Figure 9:
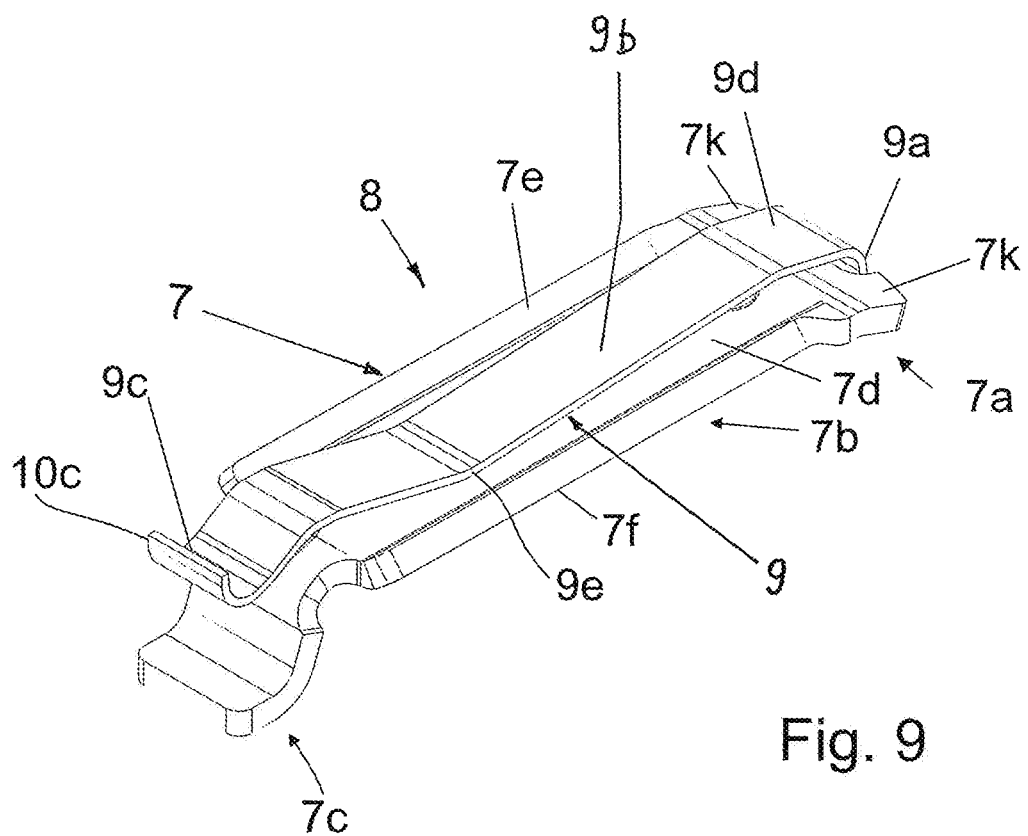
FIG. 9 shows a perspective illustration only of the leaf spring and the hold-down as the essential components of the hold-down arrangement.

According to FIGS. 8 and 9, the leaf spring 9 is supported on the outside on the lining hold-down 7 only by way of a very short longitudinal section which is designed as a kink or bend 9e. The leaf spring 9 is therefore provided with the bend or the kink 9e on said short longitudinal section which is situated on the middle third of the length of the leaf spring 9 and above the lining shaft 6, which bend or kink 9e extends transversely with respect to the longitudinal extent of the leaf spring 9. The bend 9e is adjoined on both sides by center sections of the leaf spring. The leaf spring 9 bears against the center section 7b of the hold-down 7 only by way of the bend outer side of the bend 9e, however. Therefore, the hold-down 7 is loaded with the spring force in the direction of the brake linings only at the location of said discrete contact.

Overall, the leaf spring according to FIG. 8 is characterized by its upper main side 9.2, its lower main side 9.1 and, following one another in the longitudinal direction, the first spring end 9a, the spring center section 9b and finally the second spring end 9c. The leaf spring 9 is of constant width over its entire length, which simplifies the manufacturing.

The outermost termination of the spring ends 9a, 9c is formed in each case by positively locking elements 10a, 10c which are angular offsets with respect to the main extent of the leaf spring. With regard to the main sides 9.1, 9.2, the positively locking elements 10a, 10c extend in opposite directions away from the main extent of the leaf spring in such a way that the first positively locking element 10a is situated on the first main side 9.1, and the second positively locking element 10c is situated on the second main side 9.2.

On its center section 9b, the leaf spring 9 has the two kinks or bends 9f, 9e with opposed bending directions, of which the bend outer side of the bend 9f which is arranged closest to the first spring end 9a is situated on the second main side 9.2, whereas the bend outer side of the other bend 9e is situated on the first main side 9.1.

In the assembled state, the bend 9f is situated just outside a slot 14 in the brake caliper, that is to say just in front of the slit opening. This is because only a short, straight spring section 9d is situated between the bend 9f and the spring end 9a with the positively locking element 10a. Its length is less than one sixth of the overall length of the leaf spring. The leaf spring 9 is supported on the upper inner face 14b of the slot 14 in the brake caliper, above all, by way of said short spring section 9d.

In contrast, the other bend 9e in the opposite direction is arranged more centrally and is situated on the middle third of the length of the leaf spring in its center section 9b.

A first spring abutment for the leaf spring 9 is situated in the form of the slot 14 on the inside of the vehicle on the brake caliper 1, and a second spring abutment is situated on the outside of the vehicle next to the lining shaft 6. The spring abutment on the outside of the vehicle has a pin 13 for fixing the relevant spring end 9c of the leaf spring 9. In contrast, the brake caliper 1 is provided with the recess which is open toward the lining shaft 6 in the form of the slot 14 in order to form the spring abutment on the inside of the vehicle. Said slot 14 at the same time provides space for the end there of the hold-down 7, and for the spring end 9a there of the leaf spring, namely for an end section of the leaf spring 9, which end section is short and is less than 3 cm in length.

Figure 11:
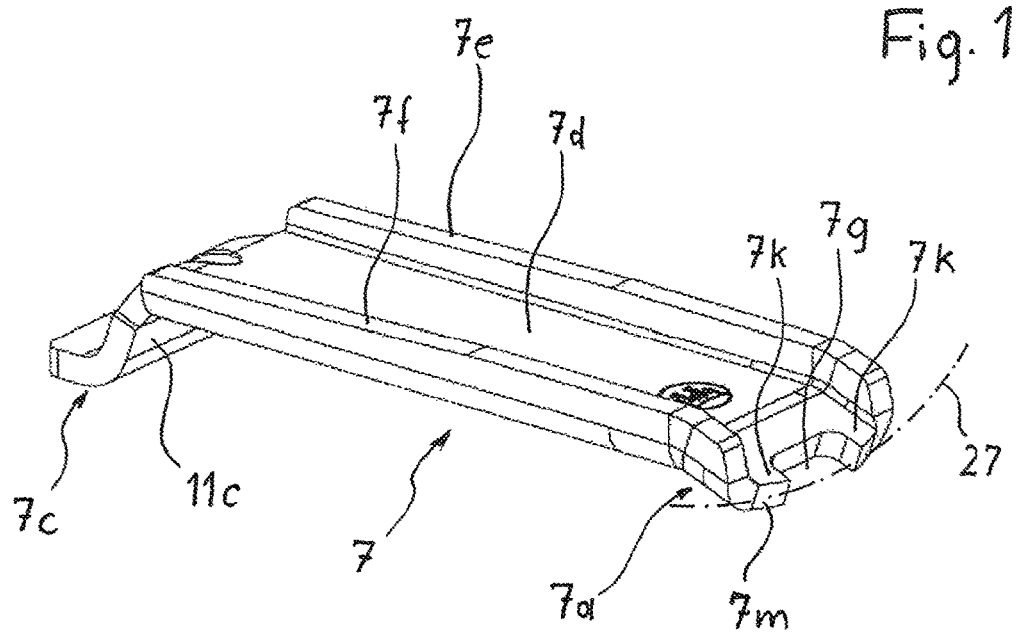
FIG. 11 shows a perspective illustration of a second embodiment of the hold-down and FIG. 12 shows the hold-down according to FIG. 11 in a longitudinal section.

For the assembly of the hold-down arrangement 8 consisting of the hold-down 7 and the leaf spring 9, it can be advantageous if the ends of said two components which are introduced jointly in an obliquely running movement into the slot 14 of the brake caliper 1 are locked to one another in the longitudinal direction. To this end, the hold-down 7 is provided at said end with a cutout 7g (FIG. 7 and FIG. 11). That positively locking element 10a of the leaf spring 9 which is bent away downward toward the brake caliper engages in a positively locking manner into the cutout 7g, in a similar manner to a hook in a matching eyelet. The consequence of said longitudinal locking of the leaf spring 9 on the hold-down 7 is that, as soon as the end 7a of the hold-down 7 is situated in the slot 14 of the brake caliper 1, the leaf spring 9 is locked in the longitudinal direction, is namely caught axially on the hold-down 7. This is achieved by the height of the slot 14 and the length of the positively locking element 10a which extends transversely with respect to the slot being dimensioned in such a way that it is not possible in the slot 14 to release the positively locking element 10a from the cutout 7g of the hold-down.

This measure serves for safety and facilitates the subsequent fixing of the hold-down 7 and, above all, of the leaf spring 9 at their other end, that is to say in the region of the spring abutment which is reproduced on the left hand side and is situated on the outside of the vehicle.

The slot 14 which is configured in the brake caliper 1 is in each case open in the lateral direction of the hold-down 7, with the result that the slot 14 is delimited only by way of a rear wall 14a, an upper inner face 14b and a lower inner face 14c of the brake caliper. Here, the upper inner face 14b is that wall of the slot 14 which faces the axis or rotational axis A of the disk brake. The lower inner face 14c is that wall of the slot 14 which faces away from the axis or rotational axis A. The two inner faces 14b, 14c preferably extend parallel to one another, that is to say do limit a parallel slot in this case.

The hold-down 7 is angled away, that is to say inclined, on its end section 7a relative to the center section 7b. Following the angular offset, the end section 7a of the hold-down 7 extends in a completely straight, that is to say non-bent or non-offset manner as far as the end side 7m which lies opposite the rear wall 14a. In the assembled state, the center line L1 of the hold-down 7 is oriented substantially parallel to the brake disk axis A. Only the end section 7a is inclined or angled away relative to the center line L1 and therefore also to the brake disk axis A by from 10° to 35°, preferably by from 15° to 25°, and particularly preferably by 20°.

According to FIG. 3a, the slot 14 in the brake caliper 1 is also arranged in the direction of its slot depth obliquely with respect to the axis A. The angle W of the oblique positioning with respect to the axis A is substantially equal to the angular offset of the inclined end section 7a of the hold-down 7. The leaf spring 9 is therefore supported under spring force on that upper inner face 14b of the slot 14 which faces the axis A.

FIG. 3a illustrates the method for producing the slot 14 by means of a milling tool F. This is because said slot 14 can be produced simply as a result of the simple shape of the slot 14 with missing side walls.

The upper inner face 14b, the lower inner face 14c which is parallel thereto, and the rear wall 14a of the slot are machined in a single feed movement in accordance with the double arrow shown in FIG. 3a, by way of the side milling cutter F which rotates on the axis A3. The machining therefore takes place by way of a single forward movement and subsequent reverse movement of the side milling cutter F. Said movements take place at the angle W and at a right angle with respect to the milling cutter axis A3.

The width of the disk of the milling cutter F determines the produced height of the slot 14. The consequence of the direction of the feed movement of the side milling cutter F is that the rear wall 14a of the slot which is produced is not planar, but rather has the form of a circular arc, the circle center point of which lies outside the slot 14. FIG. 7 and FIG. 11 illustrate said circular arc 27, but on the basis of the corresponding circular contour of the end side 7m of the hold-down 7 in this case. The imaginary circle center point of the circular arc 27 is situated outside the brake caliper, namely on the outside above the lining shaft 6.

Figure 2A:
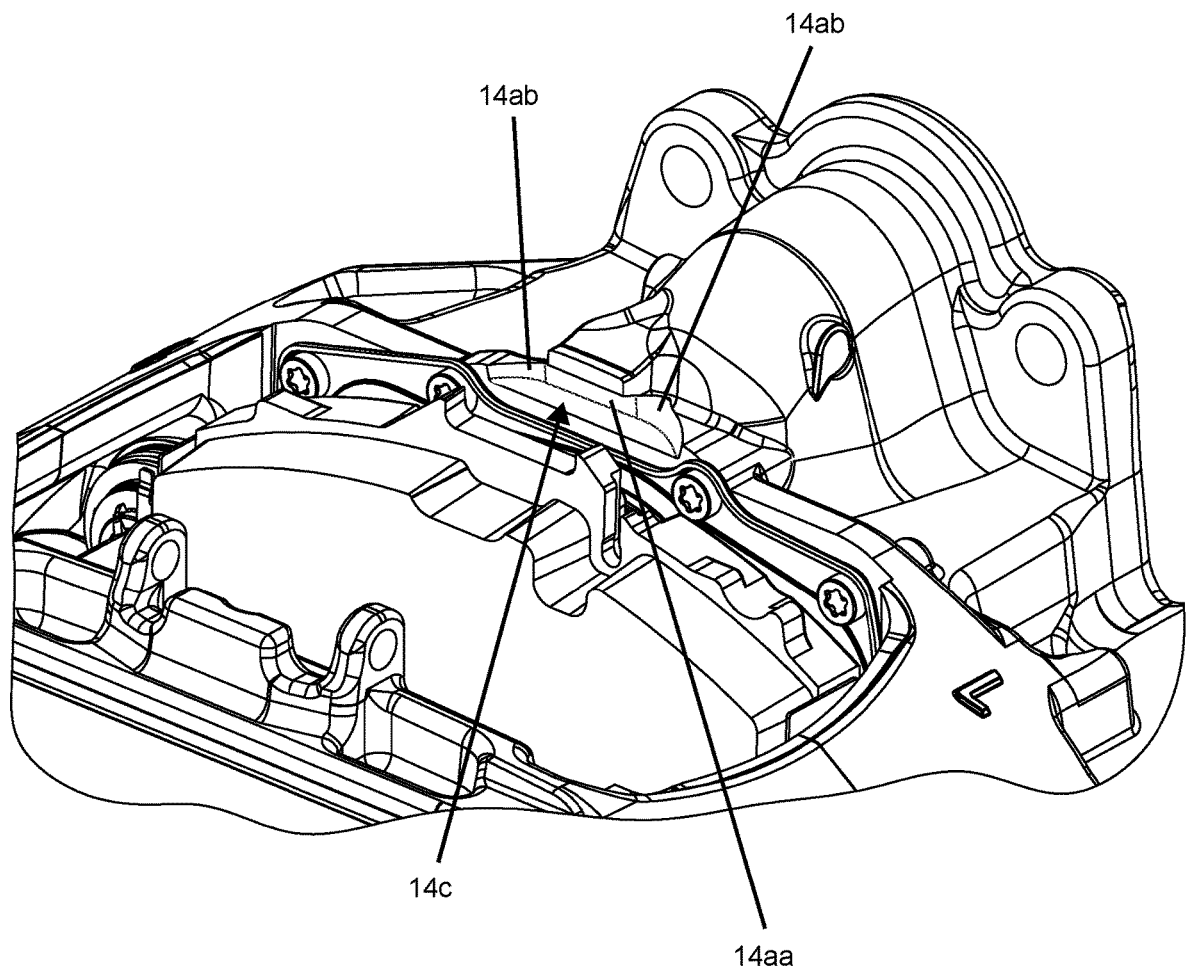
FIG. 2a shows a variant of the slot of the brake caliper.

As an alternative, there is the possibility to move the side milling cutter F somewhat to the side, after it has been moved to a maximum extent in the direction of the depth of the slot 14, and only then to withdraw it. Here, a rear wall 14a is formed (see FIG. 2a) which consists of a straight center section 14aa and circular arc sections 14ab which adjoin the former in a step-free manner, wherein the circle center points of the circular arc sections 14ab are once again situated outside the brake caliper above the lining shaft 6.

Advantages for the strength of the brake caliper 1 result from the upper inner face 14b of the slot 14 being inclined at the angle W. This is because the material thickness M (FIG. 3) which the brake caliper 1 has between the upper inner face 14b and the brake caliper outer side increases considerably starting from the lining shaft 6, namely in the form of a widening wedge. In addition, valuable space is saved at this important location of the brake caliper 1. This is advantageous, since there is only a small radial spacing as far as the vehicle rim or the vehicle wheel which rotates about the brake caliper at said location of the brake caliper outer side. Only a very limited amount of space for fastening of the hold-down 7 or the structural unit comprising the hold-down 7 and the leaf spring 9 is usually available precisely in the region around the lining shaft.

The cutout 7g of the hold-down 7 is open in the direction of the rear wall 14a, the upper inner face 14b and the lower inner face 14c of the slot 14, whereas it is delimited in the lateral direction, that is to say in the direction of the lateral openings of the slot 14, by way of side sections 7k of the first end section 7a of the hold-down 7. The side sections 7k also run in an inclined manner with respect to the center section 7b, since they are a constituent part of the first end section 7a which overall runs in an inclined manner with respect to the center section 7b. The cutout 7g is therefore of U-shaped form or contour which is open at the top and at the bottom, the end-side opening of the U-shaped cutout 7g pointing in the direction of the rear wall 14a of the slot 14.

According to FIG. 7, the hold-down 7 is of narrower design with a width B on its second end section 7c which lies on the outside of the vehicle than on the comparatively longer longitudinal section or center section 7b which has the form of a channel. The width B on said end section 7c is not greater than the width of the base 7d. Above all, the hold-down 7 is provided on said end section with an offset 11 which adjoins the base 7d which runs in an elongate manner, by the hold-down 7 first of all having a first bend 11a toward the bottom starting from the base 7d and, adjoining this, a second bend 11b as counter-bend. The second bend 11b is adjoined, as an end of the hold-down 7 on the outside of the vehicle, directly by a straight longitudinal section 12. In this way, the straight longitudinal section 12 lies lower or closer to the rotational axis A than the base 7c of the channel-shaped center section 7b.

The S-shaped offset 11 is preferably configured in such a way that its second bend 11b which merges directly into the straight end section 12 does not directly adjoin the first bend 11a, but rather a short section 11c which runs in a straight line is also situated in between. The angle thereof with respect to the channel-shaped longitudinal section is, for example, 110°.

The longitudinal section 12 extends on a length L substantially parallel to the rotational axis A and offset in parallel to the considerably longer, channel-shaped center section 7b. For example, the hold-down 7 can have an overall length of approximately 150 mm. The end section 12 then runs offset by from 15 to 20 mm with respect to the base 7d of the channel-shaped section.

The region of the offset 11 can be reinforced by way of one or more reinforcing beads 11d, since the hold-down 7 is relatively slim here with the width B, and bending forces can occur. The hold-down 7 preferably consists of punched and formed steel sheet with a material thickness of at least 4 mm.

In the case of a pin 13 which is assembled on the brake caliper, said pin 13 is reached under without contact by the offset 11 or the longitudinal section 12 which forms the end of the second end section 7c of the hold-down 7 (FIG. 4). Nevertheless, said end region of the hold-down is caught by way of the pin 13 which is arranged above it, in such a way that it cannot be detached from the lining shaft 6 to the outside under any circumstances. The offset 11 and the longitudinal section 12 as the end of the second end section 7c of the hold-down 7 are at such a vertical spacing from the pin 13 in the assembled state that no contact occurs.

The hold-down 7 lies from above on the rear plates 5 of the two brake linings 2, 3, and can be moved there initially only in its longitudinal direction, but in contrast is held in a fixed manner transversely with respect thereto by means of lateral shaped elements of the brake linings. The two brake linings 2, 3 can be moved freely in the lining shaft 6 in the direction of the rotational axis A of the brake disk, and are guided with a certain play in the circumferential direction of the brake disk. This combination of freedom of movement leads to the hold-down 7 being mounted on the brake linings 3 such that it can be moved or can float to a limited extent in its longitudinal extent freely and transversely with the brake linings 3. In the assembled state, the movement in its longitudinal extent is delimited tightly by way of respective stops on the brake caliper 1. To this end, the stop faces, between which the hold-down 7 can move, are machined, for example, by way of milling of the brake caliper 1.

In the longitudinal direction of the hold-down 7, a projection 15 which is integrally formed on the brake caliper 1 lies at a small spacing opposite the second end section 7c of said hold-down 7. The projection 15 therefore forms a stop which limits the longitudinal movability of the hold-down 7 toward the outside of the vehicle. The projection 15 preferably extends as far as close to the circumference of the pin 13, but without making contact with the pin 13.

Two bearing blocks 50 which are integrally formed on the brake caliper 1 have in each case one bore, in which the pin 13 is seated on the axle 13a. In order that the pin 13 cannot be released from the bearing blocks 50 and therefore from the caliper 1 in the pin longitudinal direction, suitable securing rings, splints or the like are provided on the pin 13.

FIGS. 1 and 3 show details of the fixing of that spring end 9c of the leaf spring 9 which is on the outside of the vehicle to the abutment. Apart from the pin 13, a constituent part of said spring abutment is a fastening hoop 60 which is connected to the brake caliper 1 by means of the pin 13 such that they can be moved pivotably about the pin axle 13*a*. The leaf spring 9 is supported with its spring end 9*c* against the inner side or lower side of the hoop 60, which inner side or lower side faces the axle 13*a*. At said spring end 9*c*, the leaf spring is provided with the positively locking element 10*c* which extends upward. The positively locking element 10*c* engages into a slot-shaped opening 61 in the hoop 60, and thus secures the pivoting position of the hoop 60.

Figure 10:
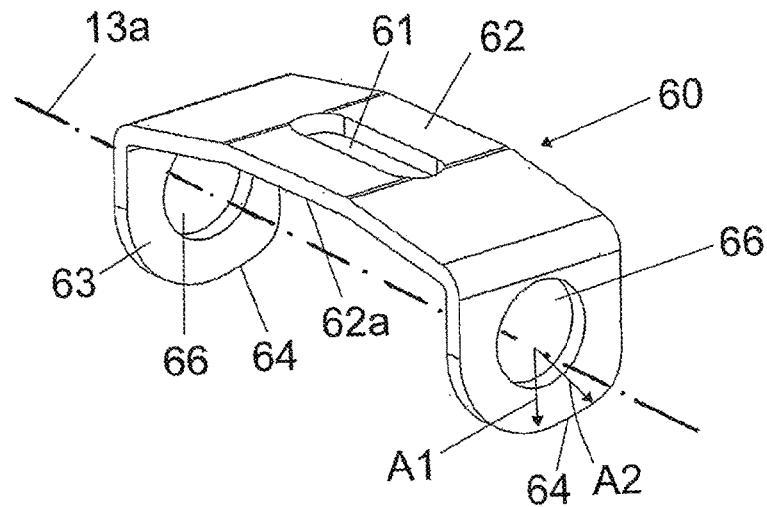
FIG. 10 shows a perspective illustration only of the hoop which is used on the brake caliper and serves at the same time as an abutment element and as a locking element.

The hoop 60 which is shown as an individual part in FIG. 10 is that abutment element for the leaf spring 9 which is on the outside of the vehicle. The hoop 60 consists of a center section 62 which is parallel to the axle 13*a* and on which the opening 61 can be situated, and two side sections 63 which are arranged approximately at a right angle in relation to the center section 62 (FIG. 10). Said side sections are designed as brackets 63 and are provided in each case with a round opening 66 which is arranged on the axle 13*a*. The axle 13*a* is at the same time the alignment axis of the two openings 66 by virtue of the fact that the two openings 66 are aligned on the axle 13*a* with respect to one another. The pin 13 passes at the same time through the two openings.

That edge of the brackets 63 which faces the disk brake rotational axis A has a rim contour 64 which is curved toward the axle 13*a*. That contour section of the contour 64 which faces the disk brake axis A forms a stop, since the contour course is such that the contour 64 is partially at a greater spacing A1 and partially at a smaller spacing A2 from the axle 13*a*. For example, the contour 64 can be eccentric-shaped or it can be circularly arcuate, but then with an offset with respect to the axle 13*a*.

The pin 13 is the fastening means, in order to releasably fasten the hoop 60 which serves as an abutment element and as a locking element to the brake caliper 1. At the same time, the end 9*c* of the leaf spring 9 bears with spring stress against that inner side of the center section 62 which faces the pin 13. Said inner side is therefore the abutment 62*a*, on which the spring end 9*c* is supported. The sum of said measures leads to securing and maintaining of the flexural stress in the leaf spring 9.

An additional securing measure is the positively locking engagement of the positively locking element 10*c* which is angled away upward and is configured at the outermost spring end 9*a* into the opening 61 of the hoop 60.

The assembly of the arrangement consisting of a lining hold-down 7, a leaf spring 9, a pin 13 and a hoop 60 as an abutment element and a locking element takes place by the leaf spring 9 first of all being placed with its one end 9*a* onto the hold-down 7 in such a way that it engages in a positively locking manner into the cutout 7*g* of that end section 7*a* of the hold-down 7 on the inside of the vehicle. The parts which are connected provisionally in this way consisting of the hold-down and the leaf spring are then pushed in an obliquely running movement into the slot 14. The first end section 7*a* which is angled away with respect to the center section 7*b* is then situated at least partially with the leaf spring 9 inside the slot 14 which is inclined with respect to the brake disk axis A. The hold-down 7 is then pivoted downward at its other end, until said other end passes onto the hold-down face 43. Here, the hold-down is at the same time placed from above onto the rear plate 5 of the brake lining 3 on the inside of the vehicle between the two stops 5*a*.

In a next step, the hoop 60 is placed onto the other spring end 9*c*, which can be facilitated by way of the engagement of the positively locking element into the opening 61 of the hoop 60 and thus becomes even safer for the assembler. Here, the end 9*c* of the spring 9 is supported on the abutment 62*a* on the inside on the hoop 60. Only the hoop 60 is then moved downward by way of manual pressure and with bending of the leaf spring, until the pin 13 passes along the axle 13*a* into the bearing blocks 50 and at the same time through the openings 66 of the hoop 60. The exertion of pressure on the hoop 60 can then be ended, since the stressing force of the leaf spring 9 is received securely by way of the hoop 60 which forms the abutment element in conjunction with the pin 13.

The leaf spring 9 holds the hold-down 7 on the brake linings 2, 3 with spring prestressing force and ensures that, in the case of a relatively powerful shock, for example when driving through a pothole, the brake lining which lifts up to the outside is pressed into its original position again. Should the leaf spring 9 break as a result of, for example, mechanical influences and therefore lose its holding function, the hold-down 7 is still held by way of the hoop 60 which is arranged above it and by way of the slot 14 in such a way that the brake linings cannot be lost.

The offset 11 (reproduced in FIG. 7) of that narrower second end section 7*c* of the hold-down 7 which lies on that side of the brake disk on the outside of the vehicle has the advantage that disk brake parts protrude radially to a lesser extent to the outside in said region, and a contribution is therefore made to alleviate the structural closeness to the surrounding vehicle wheel which rotates about the brake. The offset 11 leads, however, to a space requirement in the region of the brake lining 2 which is arranged on that side of the brake disk on the outside of the vehicle. This is therefore designed in a special way, which will be described in greater detail in the following text.

Figure 6:
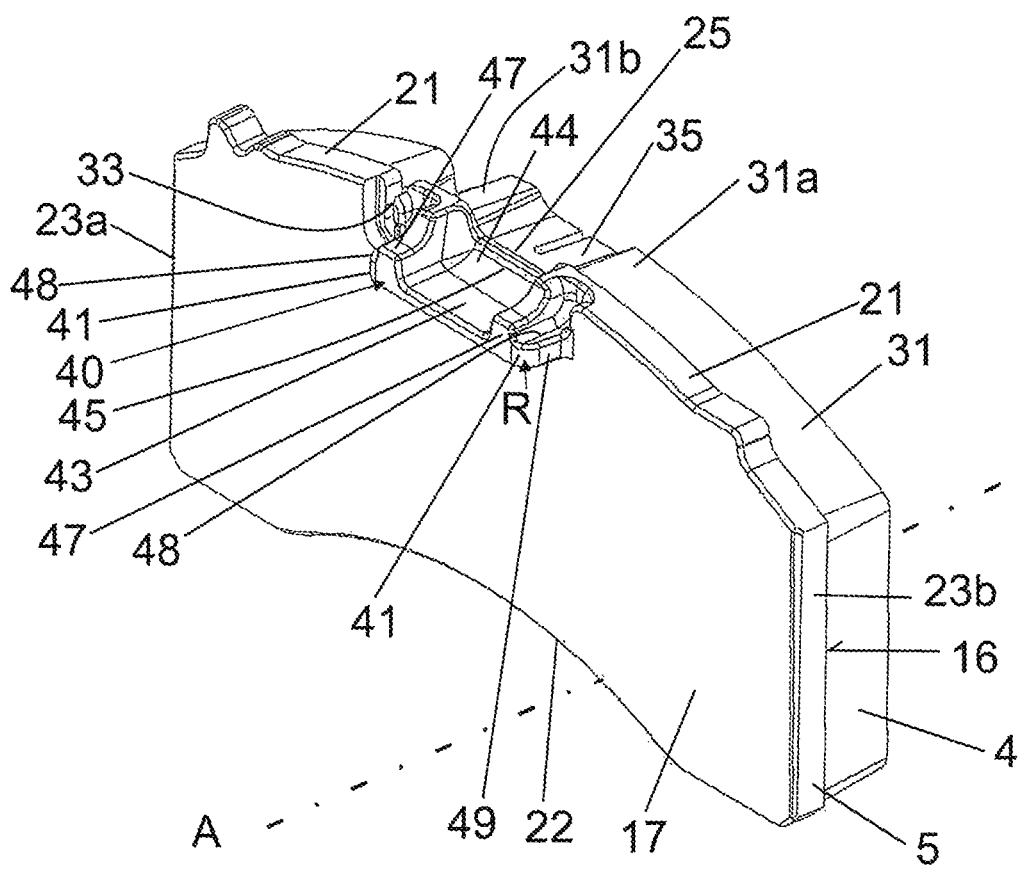
FIG. 6 shows a perspective illustration only of the brake lining with a rear plate which faces the observer.

According to FIG. 6, the brake lining 2 which is arranged on that side of the brake disk on the outside of the vehicle consists of the stable rear plate 5 and the friction lining 4 which is intended for contact against the brake disk. Said rear plate 5 consists, for example, of cast steel, the front side being configured as a fastening face 16 for the friction lining 4, whereas the rear side 17 is configured as a pressure face for the transmission of the brake pressure. This is because the rear plate 5 bears with said rear side 17 against a corresponding, pressure-exerting face 18 of the brake caliper 1. The face 18 is at the same time a wall of the lining shaft 6.

The circumferential contour of the rear plate 5 is defined by way of an upper or (with regard to the rotational axis A) outer rim 21, an inner or lower rim 22 which faces the rotational axis A, and two side rims 23*a*, 23*b* which extend between the upper and the lower rim and run parallel to one another.

The upper or outer rim 21 is distinguished by a main course which takes up the shape of the brake disk. To this end, the upper rim 21 mainly (that is to say, over its predominant length) exhibits a circularly arcuate course which assumes the circular shape on the circumference of the round brake disk. This has the advantage that the brake lining 2 does not project radially to the outside beyond the technically required circumference of the brake disk.

The rear plate 5 is supported in the circumferential direction by way of the two side rims 23*a*, 23*b*, with the result that the brake torques are transmitted to the brake caliper 1 or, as an alternative, to a brake carrier of the disk brake, which brake carrier is mounted fixedly on the axle. To a smaller extent, the transmission of the brake torques can also take place via the lower rim 22 of the rear plate 5 to the brake carrier if there is a brake carrier.

The friction lining 4 is also distinguished at its upper or outer rim 31 by a main course which takes up the shape of the brake disk. To this end, the upper rim 31 mainly (that is to say, over its predominant length) exhibits a circularly arcuate course which assumes the circular shape on the circumference of the round brake disk, as a result of which said rim also does not project radially to the outside beyond the circumference of the brake disk, but there is at the same time a maximum of contact area between the friction lining 4 and the brake disk.

If the rims 21, 31 have a fundamentally arcuate course, this includes individual deviations from said main design. For instance, a narrow recess 33 can be arranged eccentrically in the friction lining 4 and the rear plate 5, which narrow recess 33 serves for fastening of an electric brake lining wear sensor there. Moreover, individual small projections can be integrally formed on the rim 21, without impairment of the arcuate main design of the rim, which projections can be advantageous, for example, within the context of the production of the brake lining.

In order to provide space and a clearance for the offset 11 of the hold-down 7, the main course of the upper rim 21 of the rear plate 5 is interrupted precisely in the middle between the two side rims 23a, 23b by way of a partial recessed portion 25 of the rim 21. The recessed portion 25 is wider than the width B of the offset hold-down section.

Therefore, in relation to the spacing from the rotational axis A, the height of the rear plate 5 is reduced radially only in the region of said recessed portion 25 to such an extent that a clearance results in the rear plate 5, through which clearance the hold-down 7 extends with at least part of its cross section.

In order to likewise provide space for the hold-down 7, the friction lining 4 also has a clearance in the same region. This is because, whereas the friction lining 4 otherwise runs mainly arcuately on its outer rim 31, this primary design is also interrupted in the middle between the two side rims 23a, 23b by way of a recessed portion 35 of the upper rim 31. The recessed portion 35 also leads to a clearance on the circumferential contour of the friction lining 4, through which clearance the hold-down 7 can extend with at least part of its cross section. To this end, the recessed portion 35 is wider than the width B of the offset hold-down section.

The bottom of the recessed portion 25 in the rear plate 5 is arranged lower and therefore closer to the rotational axis A than those sections 31a, 31b of the upper rim 31 of the friction lining 4 which adjoin the recessed portion 35 directly in the circumferential direction, which recessed portion 35 is configured in the friction lining 4.

Therefore, a clearance for the crossing of the hold-down is provided by way of the recessed portion 25. As a result, on said part of its length, the hold-down 7 assumes a position less far to the outside radially, which reduces the risk, brought about by way of the structural closeness between the components of the disk brake and the vehicle wheel which rotates about the brake, of grinding of brake parts on the inside against the rotating vehicle wheel occurring.

According to FIG. 6, a lug 40 is integrally formed on the rear side 17 of the rear plate 5, below the upper rim 21 thereof. The lug 40 is arranged closer to the upper rim 21 than to the lower rim 22 of the rear plate 5. It is positioned centrally in the circumferential direction of the brake lining 2, that is to say at the same spacing from the two side rims 23a, 23b. For the purpose of its support on a correspondingly designed face of the brake caliper 1, it is provided with at least one downwardly directed supporting face 42 (FIG. 4). The latter lies at a right angle with respect to the rear side 17 of the rear plate 5, and is supported on the bottom of a recess 38 (FIG. 5b), with which the brake caliper 1 is provided.

Figure 5:
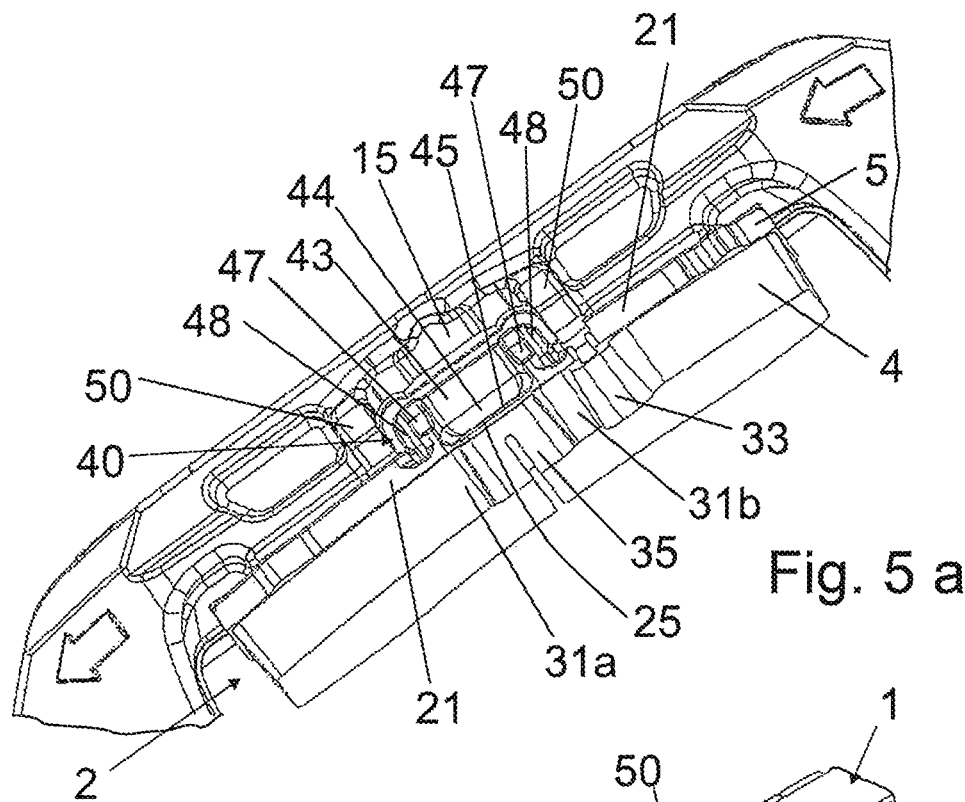
FIG. 5a shows the left hand region of FIG. 1 on an enlarged scale.
FIG. 5b shows the same region as FIG. 5a, but with a missing brake lining.
Figure 5:
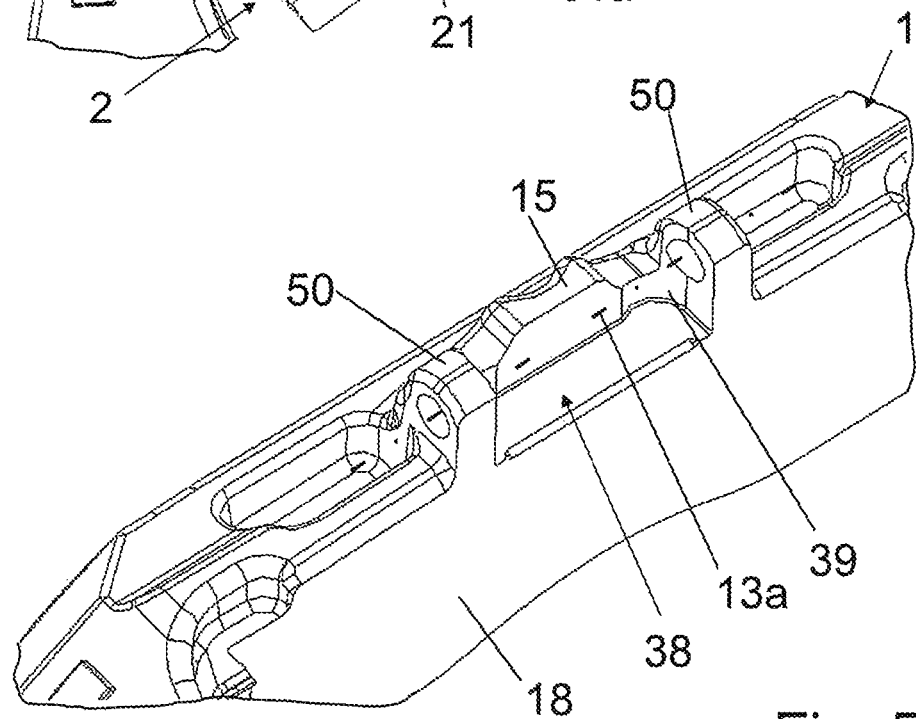

The lug 40 has a rectangular outline in a plan view from above. The two outer corners 41 of the lug 40 which are spaced apart from the rear side 17 are in each case rounded, with a corner radius R of in each case at least 4 mm. The rounded nature of the corners 41 has advantages in terms of manufacturing technology in relation to the machining of the corresponding recess 38 in the brake caliper 1 (FIG. 5b). Said recess 38 serves as a lining receptacle by receiving at least part of the lug 40 of the brake lining, and it is provided for this purpose with correspondingly rounded inner corners 39 with a corner radius of at least 4 mm.

Facing away from the supporting face 42, a flat hold-down face 43 with a width of from 10 to 20 mm and a length or depth of at least 7 mm is configured on the lug 40. The hold-down face 43 is arranged lower and therefore closer to the rotational axis A than the recessed portion 25. The hold-down 7 is supported against the brake lining exclusively on the hold-down face 43, namely by way of the lower side of the short longitudinal section 12 which follows the offset 11, which lower side forms a support face 12a.

The longitudinal section 12 is at the same time the end section of the second end section 7c and therefore of the hold-down 7. Its end face lies opposite a transverse wall of that recess 38 of the brake caliper 1 which receives the lug 40 at least partially.

Toward the friction lining 4, the hold-down face 43 for the contact of the hold-down 7 is adjoined by a transition face 44 which is shorter in comparison. The transition face 44 rises as far as the bottom of the recessed portion 25, for example in the form of a bend or, as an alternative, an oblique ramp. The transition face 44 meets the bottom of the recessed portion 25 at an edge 45, said edge 45 being arranged, according to FIG. 4, in a plane of the rear plate 5, which plane is situated between the plane of the fastening face 16 and the plane of the rear side 17.

The hold-down face 43 is adjoined laterally, that is to say as viewed in the circumferential direction of the brake lining, in each case by a rim region 47 which protrudes beyond the hold-down face 43. That end section 12 of the second end section 7c of the hold-down 7 which is supported on the hold-down face 43 is therefore flanked by the two elevated rim regions 47, as a result of which the hold-down 7 has no or little lateral play in relation to the brake lining 2.

In the case of a mounted hoop 60, it is not only an abutment element for the leaf spring 9, but rather it is also at the same time a locking element. This is because the rim contours 64 of the brackets 63 form a stop which is not spaced apart or is spaced apart only a little from faces which are configured on the lug 40 so as to lie opposite. As a consequence, no lifting or only slight lifting of the brake lining 2 with its supporting face 42 from the brake caliper is possible. Said locking action is achieved by a groove 48 which forms the counterstop being configured in each of the two rim regions 47 of the lug 40.

As viewed in the circumferential direction of the brake lining 3, the grooves 48 are arranged in front of and behind the center of the rear plate 5, their spacing from said center being the same. Each groove 48 extends along the respective side face 49 of the lug 40. The base of each groove 48 faces the pin 13 and either lies opposite the respective contour 64 of the hoop 60 at a small spacing, or there is even a permanent contact between the contour 64 and the bottom of the groove 48. If there is no permanent contact, the spacing is at any rate small, however, and is smaller, above all, than the spacing of the pin 13 from the offset 11 and from the end section 12 of the hold-down 7.

The contours 64 on the hoop 60 which serves as a locking element therefore in each case form a stop, and the grooves 48 on the brake lining 2 in each case form a counterstop. Should the brake lining 2 therefore come into contact at the top on account of pronounced vibrations, which leads to equally great lifting even of the hold-down 7, this movement is locked at the latest when the groove 48 comes into contact with the contour 64. An even greater movement which would then have to be absorbed entirely by the leaf spring 9 is prevented, and the service life of the leaf spring 9 is thus extended.

The grooves 48 can be of open design along their one side, namely toward the respective side face 49 of the lug 40. The grooves 48 can be open at their end which faces away from the rear plate 5. Facing the rear plate 5, they are of such a length that they extend not only over the depth of the lug 40, but rather as far as into the thickness of the rear plate 5. As a result, it is possible that the stop which is formed by way of the contour 64 of the side sections 63 lies close to the rear plate 5. As a result, a tilting moment in the case of contact with the brake lining 3 is minimized or even avoided.

On the vehicle inner side, the hold-down 7 is spaced apart only slightly from the leaf spring 9, and the one end 9a of the leaf spring 9 even engages partially into the U-shaped cutout 7g of the first end section 7a of the hold-down 7 in a positively locking manner. The engagement of the leaf spring 7 into the cutout 7g is the same as that of a hook engagement into an abutment.

The leaf spring 9 is supported by way of the spring segment 9d which adjoins the hook-like spring end 9a on the upper inner face 14b of the slot 14, which inner face 14b faces away from the lining shaft 6. Therefore, the inner one of the two brake linings can also lift up only slightly from its radial supporting face as a result of the action of the hold-down 7.

Overall, it is achieved that the two linings 2, 3 are held by means of spring force radially with respect to the disk brake axis A, and that, in the case of lifting up of one or both brake linings, the travel in this regard is limited strictly by way of stops and counterstops.

According to FIGS. 7 and 9, the hold-down 7 is provided on its first end section 7a with two side sections 7k which continue the base 7d of the hold-down 7 at an inclination angle, on each side of the cutout 7g which is likewise arranged in the first end section 7a. The side sections 7k are situated in an extension of the side flanks 7e, 7f of the center section 7b which is designed as a groove, and, as viewed in the longitudinal direction of the hold-down 7, have a course which is angled away in comparison with the center section 7b but is straight per se. The remaining part of the first end section 7a is also angled away relative to the center section 7b.

For a low-play adaptation to the circularly arcuate rear wall 14a of the slot 14 which lies opposite, the end side 7m which extends on a corresponding circular arc 27 (FIG. 7) forms the outermost termination of the hold-down 7. The imaginary circle center point of the circular arc 27 is situated outside the hold-down 7, namely above the center section 7b.

Figure 12:
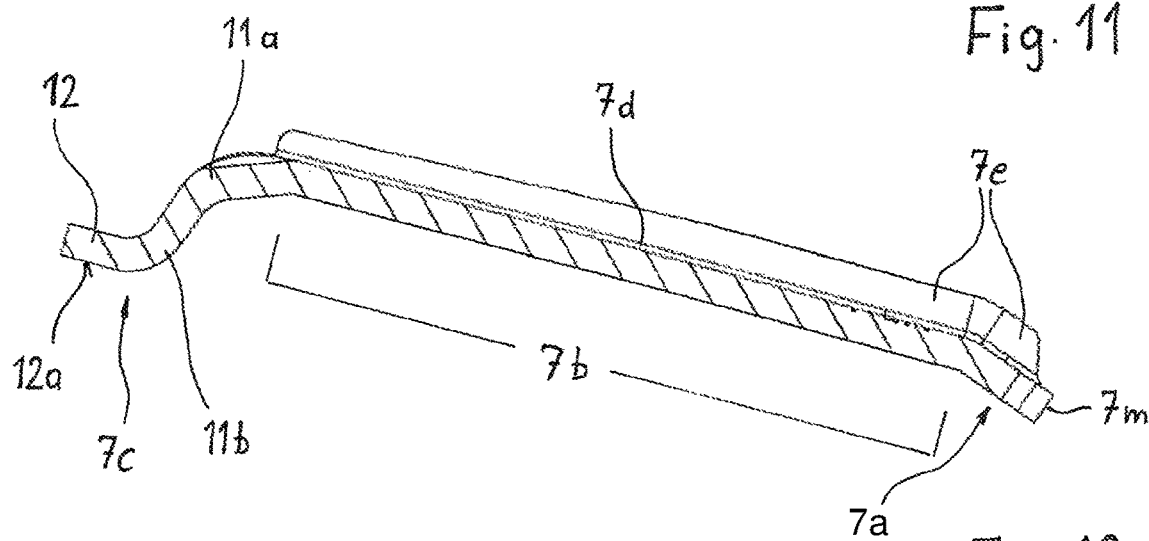

FIGS. 11 and 12 show another embodiment of the hold-down 7. This is because, in relation to its stability, it can be advantageous if the two side flanks 7e, 7f are additionally extended by extending not only along the long, straight base 7d, but rather also along the first end section 7a which is arranged obliquely with respect thereto.

The side flank sections which are additional in this respect can serve to support the hold-down 7, seated in the slot 14 of the brake caliper, in the lateral direction with respect to the brake caliper 1, if the inner width between the additional side flank sections is greater than or equal to the width of the slot 14.

The side flanks 7e, 7f are set at a steeper angle in relation to the base 7d than in the case of the first embodiment of the hold-down. Moreover, it can be seen from FIG. 11 that the height of the side flanks 7e, 7f decreases toward the second end section 7c. This is because in practice there is only a small spacing from the surrounding vehicle wheel, that is to say from the inner side of the wheel rim, in said part of the disk brake which lies further on the outside of the vehicle.

LIST OF REFERENCE CHARACTERS

1 Brake caliper
2 Brake lining
3 Brake lining
4 Friction lining
5 Rear plate
5a Stop
6 Lining shaft
7 Hold-down
7a First end section
7b Center section
7c Second end section
7d Base
7e Side flank
7f Side flank
7g Cutout
7k Side section
7m End side
8 Hold-down arrangement
9 Leaf spring
9a End of the leaf spring
9b Center section
9c End of the leaf spring
9d Spring section
9e Bend, kink
9f Bend, kink
10a Positively locking element
10c Positively locking element
11 Offset
11a Bend
11b Bend
11c Straight section
11d Reinforcing bead
12 Longitudinal section
12a Support face
13 Pin
13a Axle
14 Slot
14a Rear wall
14b Upper inner face
14c Lower inner face
15 Projection
16 Fastening face
17 Rear side
18 Face
Upper rim
22 Lower rim
23a Side rim
23b Side rim
25 Recessed portion in the rear plate
27 Circular arc 31 Upper rim
31a Section
31b Section
33 Recess
35 Recessed portion in the friction lining
38 Recess in the brake caliper
39 Inner corner
40 Lug
41 Corner
42 Supporting face
43 Hold-down face
44 Transition face
45 Edge
47 Rim region
48 Groove
49 Side
50 Bearing block
60 Hoop, abutment element, locking element
61 Opening
62 Center section
62a Abutment
63 Side section, bracket
64 Contour, stop
66 Opening
A Axis, rotational axis of the brake disk
A1 Spacing
A2 Spacing
A3 Rotational axis, side milling cutter
B Width
F Side milling cutter
L Length of the end section
L1 Longitudinal center line
M Material thickness
R Corner radius
W Angle

What is claimed is:

1. A disk brake having a brake caliper (1) which engages over a brake disk, which can be rotated on an axis (A), and over brake linings (2, 3) which are arranged on the two sides thereof in a lining shaft (6), having a hold-down arrangement (8) which leads transversely over the brake linings (2, 3) consisting of a rigid hold-down (7) and a leaf spring (9), the hold-down (7) having a center section (7b), which forms the greatest part of its overall length and leads over the lining shaft (6), and two end sections (7a, 7c), said hold-down (7) being supported against the brake linings (2, 3) toward the disk brake axis (A) and extending with its first end section (7a) into a slot (14) of the brake caliper (1), and the leaf spring (9) extending in the longitudinal direction of the hold-down (7) and being supported resiliently against an outer side of the hold-down (7), wherein the outer side faces away from the brake linings (2, 3), characterized in that the first end section (7a) which extends into the slot (14) is angled away relative to the center section (7b) of the hold-down (7).

2. The disk brake as claimed in claim 1, characterized in that the slot (14) is at least limited by way of a rear wall (14a), an upper inner face (14b) which faces the axis (A), and a lower inner face (14c) which faces away from the axis (A), and in that the upper inner face (14b) is arranged obliquely at an angle (W) with respect to the axis (A).

3. The disk brake as claimed in claim 2, characterized in that the upper inner face (14b) of the slot (14) has the same inclination relative to the center section (7b) as the first end section (7a).

4. The disk brake as claimed in claim 2, characterized in that the lower inner face (14c) is also arranged at an angle obliquely with respect to the axis (A), the lower inner face (14c) being arranged parallel to the upper inner face (14b).

5. The disk brake as claimed in claim 1, characterized by a cutout (7g) in the first end section (7a), into which cutout (7g) the leaf spring (9) engages with its one end.

6. The disk brake as claimed in claim 5, characterized in that the slot (14) is in each case open in the lateral direction of the hold-down (7), by the slot (14) being delimited only by way of the rear wall (14a), the upper inner face (14b) and the lower inner face (14c), wherein the cutout (7g) is open in the direction of the rear wall (14a) and of the upper and lower inner faces (14b, 14c) of the slot (14), and is delimited in the lateral direction on both sides by way of side sections (7k) of the hold-down (7).

7. The disk brake as claimed in claim 1, characterized in that the slot (14) is in each case open in the lateral direction of the hold-down (7), by the slot (14) being delimited only by way of the rear wall (14a), the upper inner face (14b) and the lower inner face (14c).

8. The disk brake as claimed in claim 1, characterized in that the first end section (7a) is angled away relative to the center section (7b) at an angle of from 10° to 35°.

9. The disk brake as claimed in claim 1, characterized in that the leaf spring (9) is supported resiliently on the upper inner face (14b) of the slot (14) and from the outside on the center section (7b) of the hold-down (7).

10. The disk brake as claimed in claim 1, characterized in that, at least on its center section (7b), the hold-down (7) is configured as a channel comprising an elongate base (7d) and side flanks (7e, 7f) which are arranged on the sides of the base (7d).

11. A brake caliper of a vehicle disk brake having a lining shaft (6) for receiving the brake linings, and the brake disk of the disk brake, which brake disk rotates on an axis (A), and having a slot (14) for fastening an end of a hold-down arrangement, which end leads over the lining shaft (6) on the brake caliper outer side, the slot (14) being at least delimited by way of a rear wall (14a), an upper inner face (14b) which faces the axis (A), and a lower inner face (14c) which faces away from the axis (A), characterized in that the upper inner face (14b) is arranged at an angle (W) obliquely with respect to the axis (A).

12. The brake caliper as claimed in claim 11, characterized in that the angle (W) of the upper inner face (14b) with respect to the axis (A) is between 10° and 35°.

13. The brake caliper as claimed in claim 11, characterized in that the brake caliper has a material thickness between the upper inner face (14b) and the brake caliper outer side, wherein the material thickness increases starting from the lining shaft (6).

14. The brake caliper as claimed in claim 11, characterized in that the lower inner face (14c) is also arranged at an angle obliquely with respect to the axis (A), the lower inner face (14c) being arranged parallel to the upper inner face (14b).

15. The brake caliper as claimed in claim 11, characterized in that the rear wall (14a) of the slot (14) extends on a circular arc (27), the circle center point of which is situated outside the brake caliper, and is situated above the lining shaft (6).

16. The brake caliper as claimed in claim 11, characterized in that the rear wall (14a) of the slot (14) consists of a straight center section and circular arc sections which adjoin the former in a step-free manner and the circle center points of which are situated outside the brake caliper, and are situated above the lining shaft (6).

17. A hold-down (7) for fastening brake linings in a disk brake having a longitudinal extent and a width which is smaller than the latter, the hold-down (7) having a center section (7b), which forms the greatest part of its overall length and leads over a lining shaft (6) of the disk brake, and a first end section and a second end section (7a, 7c), characterized in that the first end section (7a) is angled away relative to the center section (7b) and in that the first end section (7a) has a cutout (7g) configured to engage a leaf spring, wherein the cutout (7g) has a U-shaped contour, wherein the U-shaped contour of the cutout (7g) is open at an end side (7m) of the first end section (7a) in a direction away from the center section (7b).

18. The hold-down as claimed in claim 17, characterized in that the first end section (7a) is angled away relative to the center section (7b) at an angle of from 10° to 35°.

19. The hold-down as claimed in claim 17, characterized in that the cutout (7g) is delimited in the lateral direction on both sides by way of side sections (7k) of the hold-down (7).

20. The hold-down as claimed in claim 17, characterized in that the cutout (7g) is open at the top and at the bottom.

21. The hold-down as claimed in claim 17, characterized in that, at least on its center section (7b), it is configured as a channel consisting of an elongate base (7d) and side flanks (7e, 7f) which are arranged on the sides of the base (7d).

22. The hold-down as claimed in claim 21, characterized in that the side flanks (7e, 7f) are arranged in each case along the base (7d) and the first end section (7a).

23. The hold-down as claimed in claim 17, characterized in that the termination of the first end section (7a) is formed by an end side (7m) which extends on a circular arc (27), the circle center point of which is situated outside of the hold-down, and is situated above the center section (7b).

24. A leaf spring (9) of a hold-down arrangement for the brake linings of a vehicle disk brake, having two main sides (9.1, 9.2) and further having a first spring end (9a), a spring center section (9b), and a second spring end (9c), wherein the first spring end (9a), the spring center section (9b), and the second spring end (9c) are arranged sequentially one after another, characterized in that the termination of the spring ends (9a, 9c) is formed in each case by a first positively locking element and a second positively locking element (10a, 10c) which extend away from the main sides in opposed directions with regard to the main sides (9.1, 9.2) in such a way that the first positively locking element (10a) is situated on the first main side (9.1), and the second positively locking element (10c) is situated on the second main side (9.2), with the leaf spring having, on the spring center section (9b), at least two bends (9f, 9e) with opposed bending directions, of which the bend outer side of the bend (9f) which is arranged closest to the first spring end (9a) is situated on the second main side (9.2), and the bend outer side of the at least one further bend (9e) is situated on the first main side (9.1).

25. The leaf spring as claimed in claim 24, characterized in that the bend (9f) which is arranged closest to the first spring end (9a) is arranged on the first sixth of the overall length of the leaf spring (9).

26. The leaf spring as claimed in claim 24, characterized in that the bend (9f) which is arranged closest to the first spring end (9a) is arranged at a spacing of from 1.5 cm to 3 cm from the first positively locking element (10a).

27. The leaf spring as claimed in claim 24, characterized in that the further bend (9e) is arranged on the middle third of the overall length of the leaf spring (9).

28. The leaf spring as claimed in claim 24, characterized in that the width of the main sides (9.1, 9.2) is constant over the entire length of the leaf spring (9).

* * * * *